(12) United States Patent
Chan et al.

(10) Patent No.: US 9,329,897 B2
(45) Date of Patent: May 3, 2016

(54) USE OF DYNAMIC PROFILES FOR CREATING AND USING A DISTRIBUTED COMPUTING ENVIRONMENT

(75) Inventors: Elwin Yam Ming Chan, Cambridgeshire (GB); H. Narfi Stefansson, Natick, MA (US); Portia O'Callaghan, Natick, MA (US); Loren Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 631 days.

(21) Appl. No.: 13/274,859

(22) Filed: Oct. 17, 2011

(65) Prior Publication Data
US 2012/0036235 A1 Feb. 9, 2012

Related U.S. Application Data

(63) Continuation-in-part of application No. 12/761,777, filed on Apr. 16, 2010, now Pat. No. 8,041,790, which is a continuation of application No. 11/880,621, filed on Jul. 23, 2007, now Pat. No. 7,730,166, which is a continuation of application No. 11/271,009, filed on Nov. 10, 2005, now Pat. No. 7,634,530.

(51) Int. Cl.
*G06F 15/177* (2006.01)
*G06F 9/50* (2006.01)

(52) U.S. Cl.
CPC ................................... *G06F 9/5027* (2013.01)

(58) Field of Classification Search
USPC .......................... 709/220, 203, 206, 224, 226
See application file for complete search history.

(56) References Cited

U.S. PATENT DOCUMENTS

| | | | |
|---|---|---|---|
| 5,050,088 A | 9/1991 | Buckler et al. | |
| 5,909,542 A | 6/1999 | Paquette et al. | |
| 6,026,397 A | 2/2000 | Sheppard | |
| 6,112,225 A | 8/2000 | Kraft et al. | |
| 6,647,408 B1 | 11/2003 | Ricart et al. | |
| 6,907,572 B2 | 6/2005 | Little et al. | |
| 6,925,642 B1 | 8/2005 | Commander | |
| 6,970,844 B1* | 11/2005 | Bierenbaum | 705/39 |
| 6,988,139 B1 | 1/2006 | Jervis et al. | |
| 7,103,628 B2* | 9/2006 | Neiman et al. | 709/201 |
| 7,243,121 B2 | 7/2007 | Neiman et al. | |
| 7,299,274 B2 | 11/2007 | Rajarajan et al. | |
| 7,376,693 B2 | 5/2008 | Neiman et al. | |
| 7,509,244 B1 | 3/2009 | Shakeri et al. | |

(Continued)

OTHER PUBLICATIONS

Raymond, The Art of Unix Programming, 2003, 549 pages.

(Continued)

*Primary Examiner* — Vivek Srivastava
*Assistant Examiner* — Normin Abedin
(74) *Attorney, Agent, or Firm* — Harrity & Harrity, LLP

(57) ABSTRACT

A system is configured to create a profile that allows a job to be performed within a distributed computing environment comprising one or more computing devices; provide an interface that allows the profile to be specified; obtain a scheduler component via the interface, where the scheduler component identifies a scheduler to be used to perform the job and an application that at least one of the computing devices, that is specified by the scheduler, is to use when performing the job; obtain, via the interface, a project component that identifies data on which the job is to be based; and create the profile based on the scheduler component and the project component.

32 Claims, 11 Drawing Sheets

(56) References Cited

U.S. PATENT DOCUMENTS

| | | | |
|---|---|---|---|
| 7,634,530 B2 | 12/2009 | Dean et al. | |
| 7,730,166 B2 | 6/2010 | Dean et al. | |
| 8,041,790 B2 | 10/2011 | Dean et al. | |
| 2002/0123671 A1 | 9/2002 | Haaland | |
| 2003/0081790 A1 | 5/2003 | Kallahalla et al. | |
| 2003/0120701 A1* | 6/2003 | Pulsipher et al. | 709/102 |
| 2003/0191795 A1* | 10/2003 | Bernardin et al. | 709/105 |
| 2003/0210275 A1 | 11/2003 | Draschwandtner et al. | |
| 2003/0237084 A1 | 12/2003 | Neiman et al. | |
| 2004/0044718 A1* | 3/2004 | Ferstl et al. | 709/200 |
| 2004/0230637 A1 | 11/2004 | Lecoueche et al. | |
| 2005/0125798 A1 | 6/2005 | Peterson | |
| 2005/0149545 A1 | 7/2005 | Zenz | |
| 2005/0188075 A1 | 8/2005 | Dias et al. | |
| 2006/0036568 A1* | 2/2006 | Moore et al. | 707/1 |
| 2006/0168347 A1 | 7/2006 | Martin | |
| 2006/0206912 A1 | 9/2006 | Klardeld et al. | |
| 2007/0083620 A1 | 4/2007 | Pedersen | |
| 2009/0024365 A1* | 1/2009 | Kropaczek et al. | 703/2 |
| 2010/0107060 A1* | 4/2010 | Ishizuka | 715/255 |
| 2010/0333092 A1* | 12/2010 | Stefansson et al. | 718/100 |

OTHER PUBLICATIONS

European Office Action for application No. 06837489.1, dated Apr. 8, 2011, 6 pages.

Flanagan et al., "Java Enterprise, in a Nutshell, a Desktop Quick Reference", O'Reilly & Associates, Inc., Paula Ferguson, ed. (1999), 662 pages.

Frey et al., "Condor-G: A Computation Management Agent for Multi-Institutional Grids", Proceedings of the 10$^{th}$ IEEE Symposium on High Performance Distributed Computing (2001) 9 pages.

Goux et al., "Metacomputing and the Master-Worker Paradigm", http:citeseer.ist.psu.edu/goux00metacomputing.html (2000) 5 pages.

Hamilton et al., "Unleashed, Prgramming Windows NT4", SAMS Publishing (1996) 1124 pages.

Hunter et al., "Java Servlet Programming", O'Reilly * Associates, Inc., Paula Ferguson, ed. (1998) 528 pages.

Husbands, "Interactive Supercomputing", 1999, 96 pages.

Kulkarni, "An Intelligent framework for Master-Worker Applications in Dynamic Metacomputing Environment", pp. 1-15, 2001.

Raman et al., "Policy Driven Heterogeneous Resource Co-Allocation with Gangmatching", Proceedings, 12$^{th}$ International Symposium on High Performance Distributed Computing, pp. 80-89, 2003.

Roy et al., "Condor and Preemptive Resume Scheduling", Grid Resource Management: State of the Art and Future Trends, Klumer Academic Publishers, Jarek Nabrzyski, ed. pp. 135-144, 2003.

Thain et al., "Distributed Computing in Practice: the Condor Experience," Concurrency: Pract. Exper., pp. 1-20, 2004.

International Preliminary Report on Patentability for Application No. PCT/US2006/044076, dated Nov. 27, 2007, 6 pages.

Notification of Transmittal of the International Search Report and the Written Opinion of the International Searching Authority, or the Declaration corresponding to PCT/US2012/060429, mailed Jan. 21, 2013, 11 pages.

* cited by examiner

USE OF DYNAMIC PROFILES FOR CREATING AND USING A DISTRIBUTED COMPUTING ENVIRONMENT

REFERENCE TO RELATED APPLICATIONS

This continuation-in-part application claims priority to U.S. patent application Ser. No. 12/761,777, filed Apr. 16, 2010, which is a continuation of U.S. patent application Ser. No. 11/880,621, filed Jul. 23, 2007, which is a continuation of U.S. patent application Ser. No. 11/271,009, filed Nov. 10, 2005, now U.S. Pat. No. 7,634,530, issued Dec. 15, 2009, the entire content of which being incorporated herein by reference.

BACKGROUND

Technical computing applications and/or programming environments provide operators, (e.g., engineers, scientists, software developers, mathematicians, educators, etc.), across a diverse range of industries, with an environment for performing technical computing. The technical computing applications and/or programming environments provide mathematical and graphical tools for mathematical computation, data analysis, visualization and algorithm development. The technical computing applications and/or programming environments may be used to solve complex problems by developing mathematical models that can be used to simulate and/or analyze the problems.

The technical computing applications and/or programming environments are often implemented as desktop applications that allow operators to interactively perform complex analysis and modeling on a single workstation. However, the single workstation can be limiting to the size of the problem that can be solved due to limited processing capacity associated with the single workstation or an amount of time available to solve the problem. In this case, the single workstation may be allocated full-time to performing the analysis and modeling while other computing resources, on a network, remain idle.

Hence, distributed computing is useful for distributing tasks to multiple computing resources, especially for a computationally intensive problem. However, most technical computing applications or programming environments were not initially designed for distributed computing. Additionally, developing new technical computing applications for use in a distributed computing environment may be prohibitively costly, time consuming, and/or complex. Thus, users may resort to performing technical computing using a desktop application, on a single workstation, which may limit a level of complexity of problems to be solved and/or increase processing time relative to performing the technical computing in a distributed computing environment.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
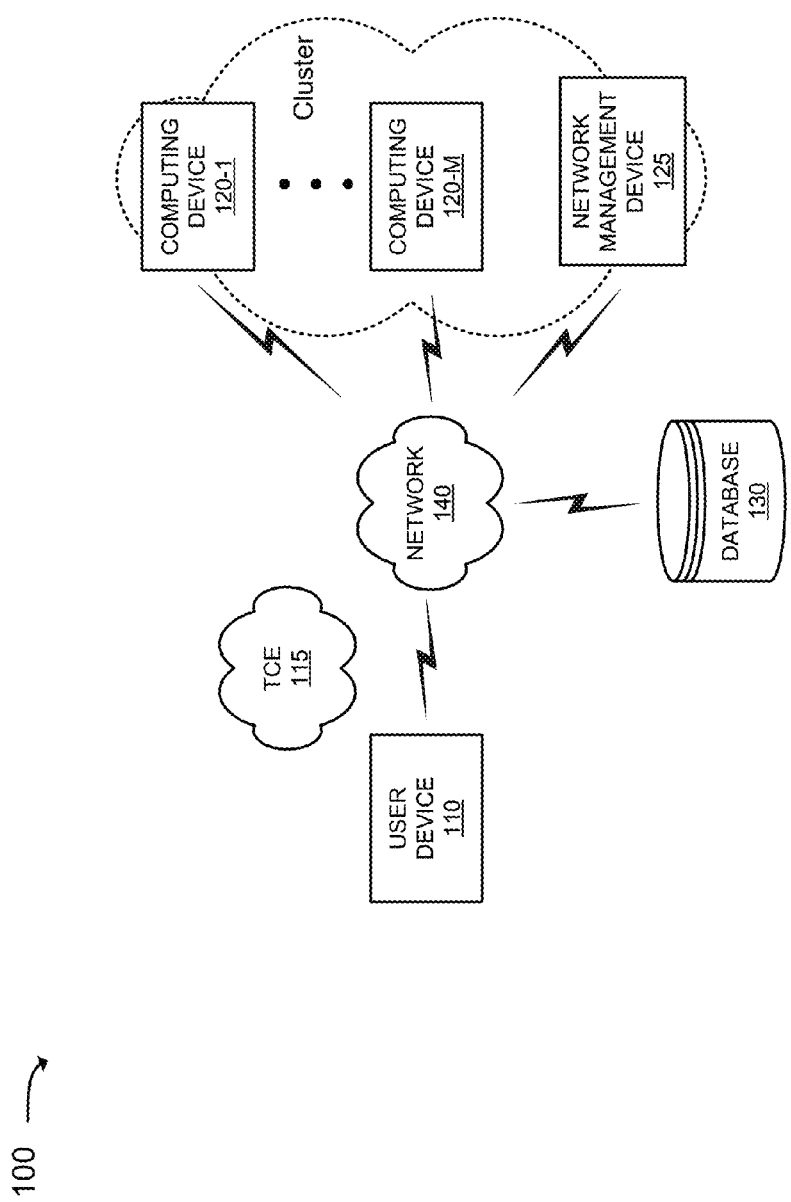
FIG. 1 is a diagram of an example environment in which systems and/or methods described herein may be implemented.

The following detailed description refers to the accompanying drawings. The same reference numbers in different drawings may identify the same or similar elements.

A system and/or method, described herein, may allow a user device to use a profile to perform a job within a distributed computing environment. The distributed computing environment may include a cluster of one or more computing devices that, when instructed to perform a job based on the profile, performs the job in a manner specified by the profile. The system and/or method may allow the user device to create the profile, with which to perform the job, based on a scheduler component and a project component. The profile may permit programming code to be executed by the distributed computing environment without causing the user to modify the programming code. The programming code may, for example, be created to execute on user device 110 as a standalone program and/or to be executed by a desk top application hosted by user device 110. The profile may, thus, allow the programming code to be executed, remotely from the user device, by the distributed computing environment without modifying the programming code.

The system and/or method may allow the user device to import, create, and/or export the profile and/or the scheduler component. The scheduler component may identify a scheduler that governs a manner in which the distributed computing environment is to perform the job. The scheduler component may also identify an application to be executed, by the one or more computing devices associated with the distributed computing environment, to perform the job and/or to return a job result as a result of performing the job. The user device may import the scheduler component from and/or export the scheduler component to one or more other user devices, a network management device, and/or the one or more computing devices.

The system and/or method may allow the user device to import, create, or export the project component. The project component may identify project information that is to be used to perform the job. The project information may include input parameters and/or variables to be used, by the application, to execute and/or generate a job result. The project information may also, or alternatively, include programming code and/or a script that, when executed by the application, generates one or more input variables that can be used, by the application, to execute and/or generate the job result. The project information may also, or alternatively, include programming code and/or a script to be executed (e.g., in addition to or instead of the application), by the one or more computing devices associated with the distributed computing environment, to generate the job result.

Embodiments may use computing environments, such as technical computing environments (TCEs) for performing computing operations. A TCE may include any hardware and/or software based logic that provides a computing environment that allows tasks to be performed (e.g., by users) related to disciplines, such as, but not limited to, mathematics, science, engineering, medicine, and business. The TCE may include text-based facilities (e.g., MATLAB® software), a graphically-based environment (e.g., Simulink® software, Stateflow® software, SimEvents™ software, etc., by The MathWorks, Inc.; VisSim by Visual Solutions; LabView® by National Instruments; etc.), or another type of environment, such as a hybrid environment that may include, for example, one or more of the above-referenced text-based environments and one or more of the above-referenced graphically-based environments.

The TCE may be integrated with or operate in conjunction with a graphical modeling environment, which may provide graphical tools for constructing models or systems or processes. The TCE may include additional tools, such as tools designed to convert a model into an alternate representation, such as source computer code, compiled computer code, or a hardware description (e.g., a description of a circuit layout). In an implementation, the TCE may provide this ability using graphical toolboxes (e.g., toolboxes for signal processing, image processing, color manipulation, data plotting, parallel processing, etc.). In another implementation, the TCE may provide these functions as block sets. In still another implementation, the TCE may provide these functions in another way.

Models generated with the TCE may be, for example, models of a physical system, a computing system, an engineered system, an embedded system, a biological system, a chemical system, etc.

As previously mentioned, an example embodiment of the TCE may use one or more text-based products, such as textual modeling environments. For example, a text-based modeling environment, may be implemented using products such as, but not limited to, MATLAB® by The MathWorks, Inc.; Octave, Python, Comsol Script, and MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. In some embodiments, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In an implementation, the text-based modeling environment may include a dynamically typed language that may be used to express problems and/or solutions in mathematical notations familiar to those of skill in the relevant arts. For example, the modeling environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array, i.e., scalar operations.

The modeling environment may further be adapted to perform matrix and/or vector formulations that may be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

In another example embodiment, the TCE may be implemented in a graphically-based modeling environment using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Example Environment

FIG. 1 is a diagram of an example environment 100 in which systems and/or methods described herein may be implemented. As illustrated in FIG. 1, environment 100 may include a user device 110, a technical computing environment (TCE) 115, a group of computing devices 120-1, . . . , 120-M (where M≥1) (hereinafter referred to collectively as "computing devices 120" and individually as "computing device 120"), a network management device 125 (hereinafter referred to as "management device 125"), a database 130, and a network 140. The quantity of devices, illustrated in FIG. 1, is provided for explanatory purposes only. In practice, there may be additional devices, fewer devices, different devices, or differently arranged devices than illustrated in FIG. 1.

Additionally, or alternatively, a device, depicted in FIG. 1, may perform a function described as being performed by another device of FIG. 1. For example, database 130, computing device 120, and/or management device 125 may be combined into a single device that performs all or some of the functions described below as being performed by an individual one of these devices. User device 110 and database 130 may also, or alternatively, be combined into a single device that performs all or some of the functions described below as being performed by an individual one of these devices. Alternatively, user device 110, management device 125, and/or database 130 may be implemented as multiple, possibly distributed, devices. The devices of environment 100 may connect via wired connections, wireless connections, or a combination of wired and wireless connections.

User device 110 may include one or more computation or communication devices capable of communicating with network 140. For example, user device 110 may include a personal computer, a laptop computer, a tablet computer, a smart phone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or another type of mobile computation or communication device.

User device 110 may host software that allows a project component and/or a scheduler component to be created. User device 110 may cause a job to be performed based on a profile. User device 110 may import a profile, a scheduler component, and/or a project component from another user device 110 and/or from management device 125. Additionally, or alternatively, user device 110 may export a profile, a scheduler component, and/or a project component by pushing (e.g., sending, transmitting, transferring, etc.) the profile, the scheduler component, and/or the project component to another user device 110 and/or management device 125. This allows the project component, the scheduler component, and/or the profile to be shared by other users of user devices 110, thereby saving the users from having to recreate the project component, the scheduler component, and/or profile themselves.

User device 110 may access TCE 115 that is hosted by user device 110 and/or when TCE 115 is hosted by one or more computing devices 110 associated with a distributed computing environment. User device 110 may execute a TCE 115 that presents a user with an interface that enables design, analysis, and generation of, for example, technical applications, engineered systems, and business applications. For example, TCE 115 may provide a numerical and/or symbolic computing environment that allows for matrix manipulation, plotting of functions and data, implementation of algorithms, creation of user interfaces, and/or interfacing with programs in other languages. Additionally, or alternatively, user device 110 may use a remote TCE 115, to perform design, engineering, analysis, etc., via a user interface that allows the user to access the remote TCE 115. The user interface may, for example, permit user device 110 to access TCE 115 as a web service (e.g., via a website, hosted by a web server, and/or some other device), via a client application (e.g., hosted by user device 110) that allows user device 110 to communicate with a distributed computing environment, etc.

Computing device 120 may include one or more devices (e.g., a personal computer, a laptop, a tablet computer, a server device, a wireless device, such as a mobile phone, a smart phone, or a personal digital assistant (PDA), or the like), one or more processors included in one of these devices, or other types of computation or communication devices, that gather, process, search, store, and/or provide information in a manner similar to that described herein. In an example implementation, computing device 120 may host an instantiation of (e.g., a copy of) TCE 115.

Computing device 120 may be connected to a network 140, such as a local area network (LAN) or a wide area network (WAN), such as the Internet. Computing device 120 may be included in a cluster of networked computing devices 120 and/or management devices 125 that correspond to a distributed computing environment as specified by a profile. Instantiations of TCE 115 may be run by the cluster of computing devices 120 and/or management device 125 in a distributed manner, such as by executing on multiple computing devices 120 and/or management device 125 simultaneously.

Management device 125 may include one or more devices (e.g., a personal computer, a laptop, a tablet computer, a server device, a wireless device, such as a mobile phone, a smart phone, or a personal digital assistant (PDA), or the like), or other types of computation or communication devices, that gather, process, search, store, and/or provide information in a manner similar to that described herein. Management device 125 may manage and/or control computing devices 120 to create a cluster of computing devices 120 that corresponds to a distributed computing environment specified by a profile. Management device 125 may communicate with one or more computing devices 120 to cause the computing devices 120 to perform a job based on a profile.

Management device 125 may also allow a network administrator to generate a scheduler component and/or a project component and/or a profile to be exported to one or more user devices 110. This allows the scheduler component and/or the project component, and/or the profile to be shared by user devices 110, thereby saving users, of user devices 110, from having to recreate the scheduler component and/or project component and/or profile from scratch.

Management device 125 may host TCE 115 and may allow computing devices 120 to access TCE 115 and/or to create instantiations of TCE 115 to perform a job. In an example implementation, management device 125 may act as computing device 120 and may perform a job by executing TCE 115. Additionally, or alternatively, management device 125 may execute programming code that was generated by a user of user device 110 or obtained based on a profile.

Database 115 may include one or more devices that store information and/or data received via network 140. Database 115 may store profiles, scheduler components, project components, and/or project information that can be accessed by user device 110, computing device 120, and/or management device 125 depending on respective access privileges.

Figure 2:
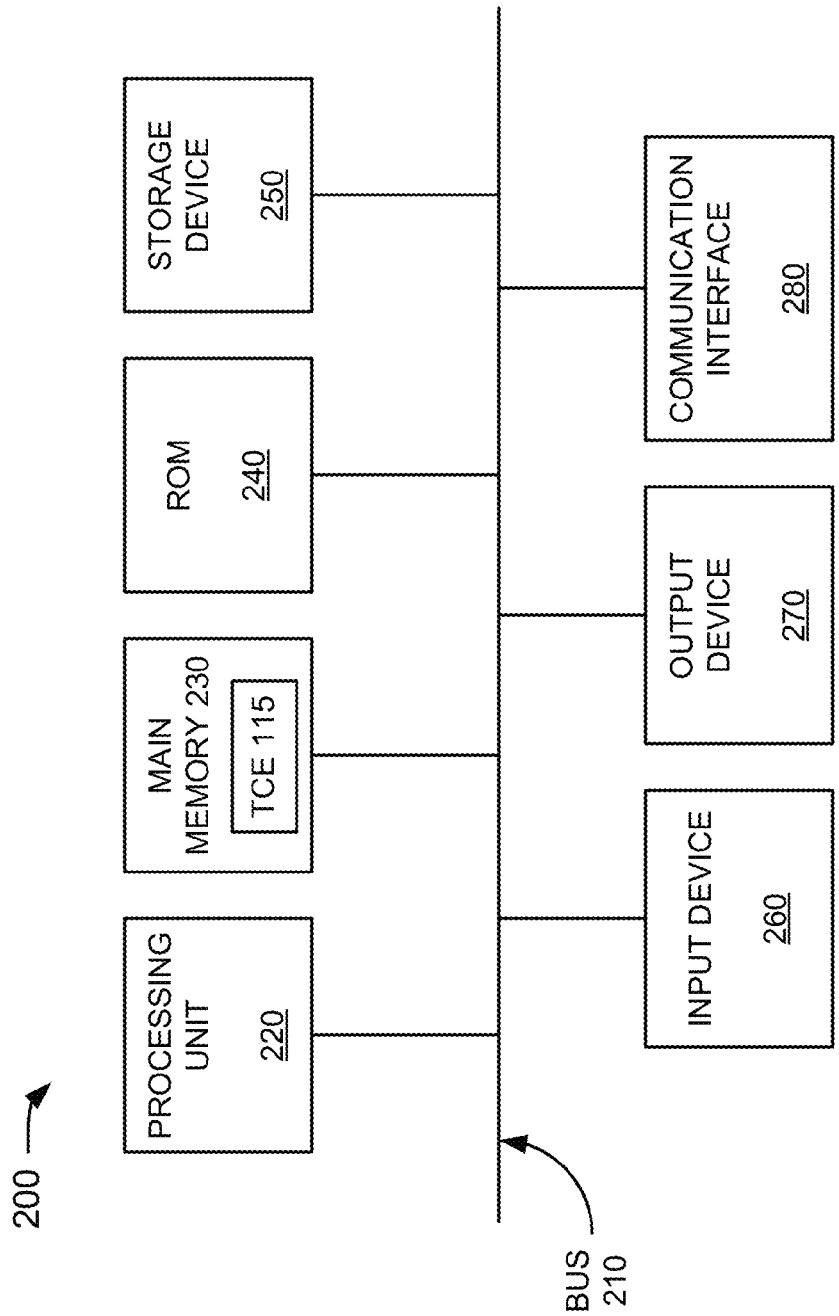
FIG. 2 is a diagram of example components of one or more devices of FIG. 1.

FIG. 2 is a diagram of an example device 200 that may correspond to user device 110, computing device 120, and/or management device 125. Alternatively, each of user device 110, computing device 120, and/or management device 125 may include one or more devices 200. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing logic that may interpret and/or execute instructions. Main memory 230 may be a tangible non-transitory computer-readable medium, such as a random access memory (RAM) or another type of dynamic storage device that may store information and instructions for execution by processing unit 220. As shown, main memory 230 may store instructions for implementing TCE 115. ROM 240 may include a read only memory (ROM) device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to device 200, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator from device 200, including a display, a printer, a speaker, etc. In the case of a display, the display may be a touch screen display that acts as both an input and an output device. Moreover, input device 260 and/or output device 270 may be haptic type devices (e.g., joysticks), tactile sensors, or other devices based on touch.

Communication interface 280 may include a transceiver-like mechanism that enables device 200 to communicate with other devices and/or systems. For example, communication interface 280 may include mechanisms for communicating with another device or system via a network (e.g., network 140).

As will be described in detail below, device 200 may perform certain operations in response to processing unit 220 executing software instructions contained in a computer-readable medium, such as main memory 230. The computer-readable medium may be defined as a non-transitory memory device, where the memory device may include a number of, possibly distributed, physical memory devices.

The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Example Data Structures

Figure 3:
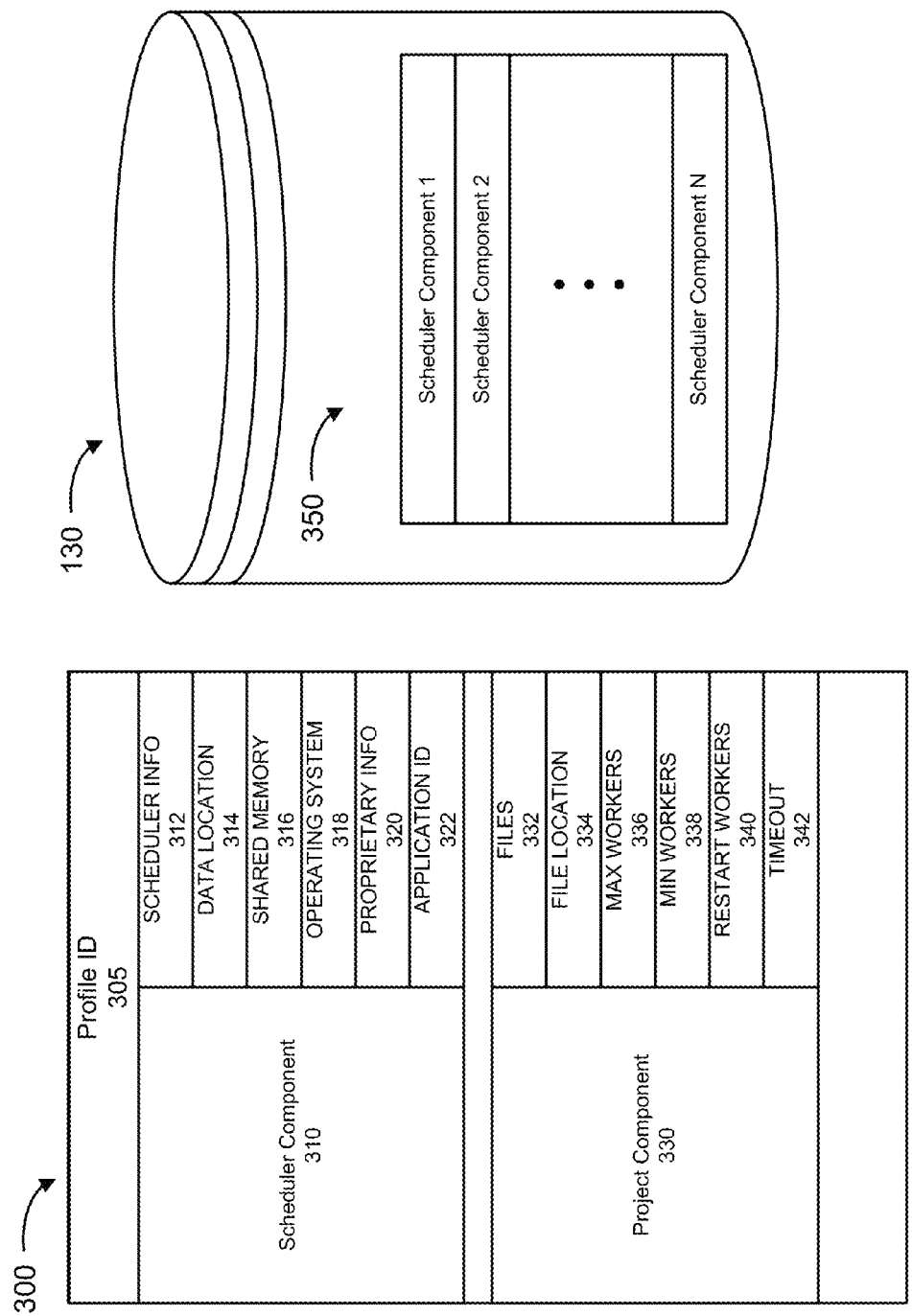
FIGS. 3A and 3B are diagrams of example data structures for storing information associated with a profile and/or one or more scheduler components, according to an implementation described herein.

FIGS. 3A and 3B are diagrams of example data structures for storing information associated with a profile and/or one or more scheduler components, according to an implementation described herein. As illustrated in FIG. 3A, data structure 300 may store information, associated with a profile, in a collection of fields, such as a profile identifier (ID) field 305, a scheduler component field 310, and a project component field 330.

Profile ID field 305 may store information (e.g., a profile name, a profile number, etc.) that uniquely distinguishes a particular profile from other profiles. Scheduler component field 310 may store information, associated with a particular scheduler component, in a collection of fields, such as a scheduler information (info) field 312, a data location field 314, a shared memory field 316, an operating system field 318, a proprietary info field 320, and an application identifier (ID) field 322.

Scheduler info field 312 may store information that identifies a scheduler, and/or a type of scheduler, to be used to perform a job based on the particular profile. The identified scheduler may include software that, when executed, identifies a manner in which one or more computing devices 120 are to be configured to establish a distributed computing environment.

Data location field 314 may store information that identifies a storage location from which application information, to be used to perform the job, is stored. The storage location may, for example, correspond to a storage location, on computing device 120, management device 125, and/or user device 110 from which an application, such as TCE 115 or some other application, can be retrieved to perform the job. Additionally, or alternatively, the storage location may correspond to a storage location associated with database 130, management device 125, user device 110, and/or one or more other locations from which the scheduler, identified in scheduler info field 312, can be retrieved and/or accessed to perform the job. Shared memory field 316 may store information that identifies a storage location where a job result is to be stored. The storage location may, for example, be accessed by a number of devices, such as user device 110, computing device 120, management device 125, and/or some other device.

Operating system field 318 may store information that identifies one or more types of operating systems being used by one or more computing devices 120 associated with the distributed computing environment. Thus, distributed computing environment may include computing devices 120 that execute a first type of operating system, a second type of operating system, or a combination of the first type of operating system, the second type of operating system, and/or another type of operating system that is different than the first and second types of operating systems. Proprietary info field 320 may store information, that is proprietary to the type of scheduler identified in scheduler info field 312, that allows the scheduler to be accessed and/or executed. Application ID field 322 may store information that identifies a particular application and/or TCE 115 that is to be executed when performing the job.

Project component field 330 may identify project information to be used to perform a job. Project component field 330 may include in a collection of fields, such as a files field 332, a file location field 334, a maximum (max) workers field 336, a minimum (min) workers field 338, a restart workers field 340, and a timeout field 342.

Files field 332 may store information (e.g., a name, a file name, an identifier, etc.) that identifies files, programming code, a script, input data, etc., that the distributed computing environment is to use to perform the job. In one example, files field 332 may identify programming code or a script, generated by a user of user device 110, that when executed by TCE 115, causes the input data to be generated. The input data may be used by TCE 115 to execute and/or to generate a job result.

In another example, files field 332 may identify programming code or a script that is to be executed (e.g., in addition to or instead of executing TCE 115), by the distributed computing environment, to generate a job result. In yet another example, files field 332 may identify input data that allows TCE 115 is to use to execute and/or generate a job result. File location field 334 may identify a storage location from which actual files, programming code, script, and/or input data, identified in files field 332, is to be accessed and/or retrieved.

Max workers field 336 may identify a maximum quantity of instantiations of TCE 115 that are to be used to perform the job. Min workers field 338 may identify a minimum quantity of instantiations of TCE 115 that are to be used to perform the job. The instantiations of TCE 115 may be established on one or more computing devices 120 and/or locally, on user device 110. Restart workers field 340 may store information that identifies conditions under which instantiations of TCE 115 are to be restarted in the event that one or more instantiations of TCE 115 crash or fail to execute properly. Timeout field 342 may store information that identifies a time period during which the distributed computing environment and/or the instantiations of TCE 115 are to execute and/or generate a job result.

As illustrated in FIG. 3B, data structure 350 may reside in database 130 and may store one or more scheduler components (e.g., scheduler component 1, . . . , scheduler component N, where N≥0). Additionally, or alternatively, data structure 350 may store one or more profiles and/or project components. Data structure 350 may be accessed by user device 110 (e.g., when a user, of user device 110, has access privileges) and/or management device 125 (e.g., when an operator, of management device 125, is a network administrator and/or has access privileges) to store and/or retrieve scheduler components, profiles, and/or project components. Additionally, or alternatively, data structure 350 may allow user device 110 and/or network management device 125 to store, in data structure 350, the scheduler components, profiles, and/or project components. Storing the scheduler components, profiles, and/or project components, to data structure 350, may permit one or more other user devices 110 to import (e.g., by retrieving, reading, etc.), from data structure 350, the stored scheduler components, profiles, and/or project components.

The quantity of fields included within data structure 300 of FIG. 3A and/or data structure 350, of FIG. 3B, are included for explanatory purposes only. In another implementation, data structure 300 and/or data structure 350 may include additional fields, fewer fields, or different fields than are described with respect to data structure 300 or data structure 350.

Example Process for Creating a Profile

Figure 4:
FIG. 4 is a flow chart of an example process for creating a profile associated with a distributed computing environment, according to an implementation described herein.

FIG. 4 is a flow chart of an example process 400 for creating a profile associated with a distributed computing environment, according to an implementation described herein. In one implementation, process 400 may be performed by user device 110. In another implementation, process 400 may be performed by a device, or group of devices, separate from, or in combination with user device 110.

As shown in FIG. 4, process 400 may include receiving a request to create a profile (block 405) and providing a user interface in response to the request (block 410). For example, user device 110 may receive a request, from a user, of user device 110, to create a profile. User device 110 may receive the request and may present, for display, a user interface that allows a profile and/or scheduler component to be imported and/or created. The user interface will be described in greater detail below with respect to FIG. 7.

As also described in FIG. 4, process 400 may include receiving a scheduler component via the user interface (block 415) and validating and/or storing the scheduler component (block 420). For example, the user may enter, via the user interface, information associated with a scheduler component (e.g., such as the information associated with the scheduler component stored in data structure 300 of FIG. 3A). In another example, the user may select, via the user interface, an existing profile and/or scheduler component, from a list of profiles and/or scheduler components, which may cause user device 110 to import the selected profile and/or scheduler component from another user device 110 and/or database 130. Creating and/or importing the profile and/or scheduler component will be described in greater detail below with respect to FIG. 6.

In an example implementation, the user may import information associated with a connection that has been established between user device 110 and a cluster of one or more computing devices 120. The information, associated with the connection, may include parameters that identify a manner in which the connection has been established, such as protocol parameters associated with protocols used, device parameters relating to devices associated with the connection, address parameters relating to network addresses associated with the devices, etc. User device 110 may permit the parameters to be stored (e.g., as an object or some other entity) in a memory associated with user device 110 or some other storage location. The user may import, via the user interface, the parameters with which to create a profile and/or scheduler component.

User device 110 may perform a validation operation on the scheduler component and/or the profile. For example, user device 110 may instruct a scheduler, identified by the scheduler component and/or profile, to perform a test to determine whether a cluster of one or more computing devices 110, associated with a distributed computing environment, execute properly. The scheduler may cause user device 110 to send an instruction, to management device 125, to perform the test. The instruction may identify which of the one or more computing devices 120 are associated with the distributed computing environment. The instruction may also identify test data to be used, by the distributed computing environment, to perform the test. User device 110 may also validate a project component locally by executing programming code, a script, etc. that is identified by the project component.

Management device 125 may receive the instruction and may cause the identified computing devices 120 to execute using the test data. Management device 125 may receive a test result from the identified computing devices 120 and may transmit the test result to user device 110. User device 110 may receive the test result and may use the scheduler validate the profile and/or scheduler component. The scheduler may, for example, compare the test result to a known result to determine whether to validate the profile and/or the scheduler component. The scheduler may validate the scheduler component and/or the profile when the test result matches the known result. The scheduler may not validate the profile and/or the scheduler component when the test result does not match the known result. In another example implementation, profile and/or scheduler component may not be validated until a project component has been created and/or associated with the profile as described below with respect to block 440.

As further shown in FIG. 4, process 400 may include receiving another request to create a project component, providing another user interface in response to the other request (block 425), and receiving the project component via the other user interface (block 430). For example, user device 110 may receive another request, from a user of user device 110, to create a project component. User device 110 may receive the other request and may present, for display, another user interface that allows a project component to be imported and/or created. The other user interface will be described in greater detail below with respect to FIG. 9.

The user may enter, via the other user interface, information associated with a project component (e.g., such as the information associated with the project component stored in data structure 300 of FIG. 3A). In another example, the user may select, via the other user interface, an existing project component, from a list of project components, which may cause user device 110 to import the selected project component from another user device 110 and/or database 130. Creating and/or importing the project component will be described in greater detail below with respect to FIG. 8.

As yet further shown in FIG. 4, process 400 may include creating a profile based on the scheduler component and the project component (block 435); validating the profile (block 440); and exporting the profile (block 445). For example, user device 110 may create a profile based on the scheduler component and/or the project component. In the case where the profile has been created (e.g., based on the scheduler component) and/or imported, user device 110 may associate the project component with the profile to create another profile.

Additionally, or alternatively, user device 110 may, in a manner similar to that described above with respect to block 420, user device 110 may validate the profile and/or the other profile. User device 110 may export the profile or the other profile, to another user device 110, in a manner to be described in greater detail below with respect to FIGS. 11A and 11B. Exporting the profile or the other profile allows the profile and/or the other profile to be shared with another user, of the other user device 110, thereby saving the other user from having to recreate the profile and/or the other profile from scratch.

Example Profile Hierarchy

Figure 5:
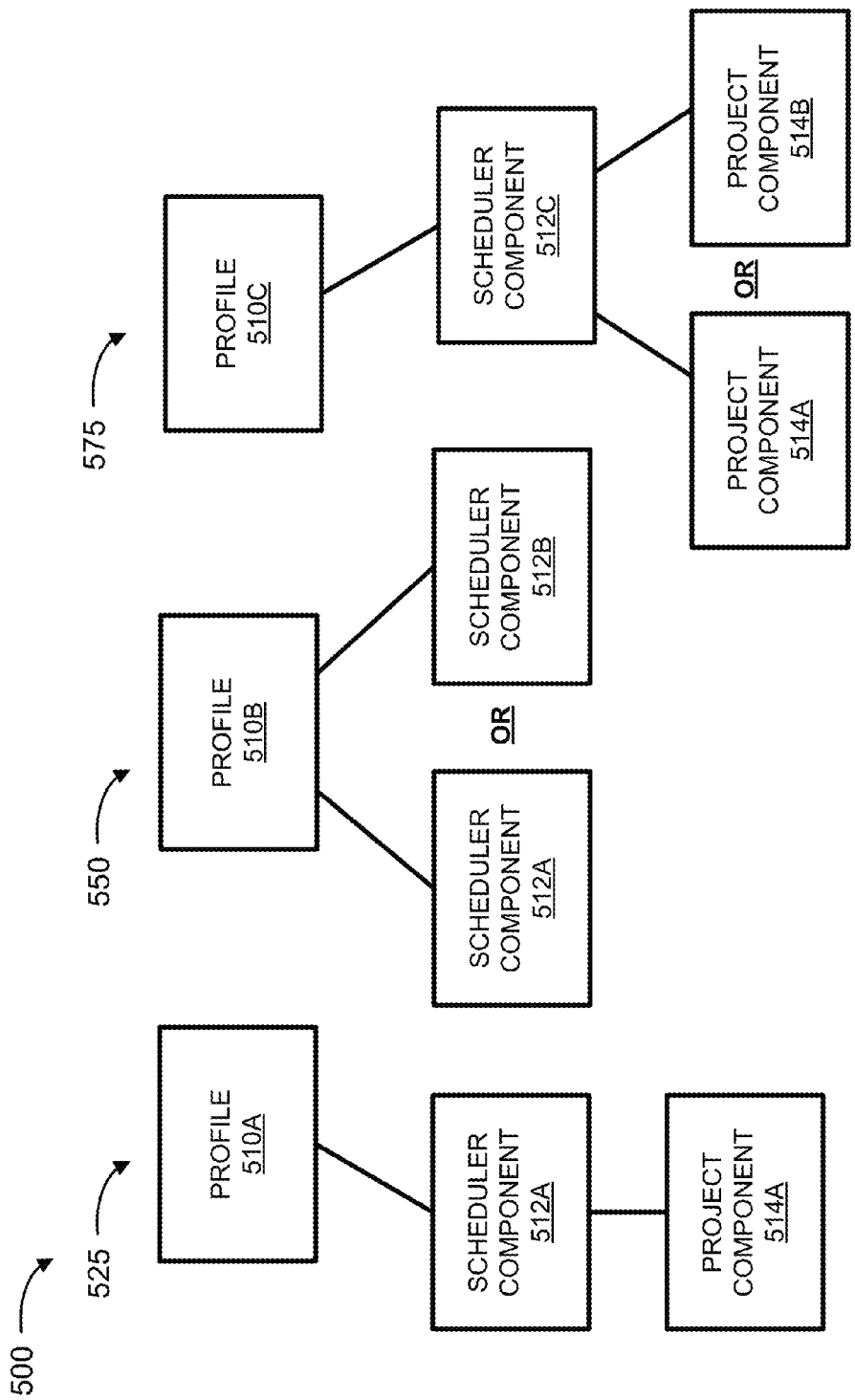
FIG. 5 is a diagram an example hierarchy associated with a profile, according to an implementation described herein.

FIG. 5 is a diagram an example hierarchy 500 associated with a profile, according to an implementation described herein. Hierarchy 500 may represent one or more hierarchical relationships between one or more profiles, scheduler components, and/or project components. The profiles may be represented by a collection of profiles 510A, . . . , 510C. The scheduler components may be represented by a group of scheduler components 512A, . . . , 512C. The project components may be represented by a pair of project components 514A and 514B.

Hierarchy 500 may include a first hierarchy 525 that includes profile 510A, scheduler component 512A, and project component 514A. Hierarchy 525 may represent a profile that has been created based on a scheduler component and a project component. For example, profile 510A may be created based on scheduler component 512A and project component 514A. Profile 510A may be use to create a job based on scheduler component 512A and project component 514A. Profile 510A may be portable, such that profile 510A (e.g., including scheduler component 512A and project component 514A) can be imported and/or exported in a manner to be described in greater detail below with respect to FIGS. 6, 7, 11A and 11B.

Hierarchy 500 may include a second hierarchy 550 that includes profile 510B, and scheduler component 512A or scheduler component 512B. Hierarchy 550 may represent a profile that has been created based on one scheduler component and which is not created based on any project component. For example, profile 510B may be created based on scheduler component 512A or scheduler component 512B, but may not be created based on both scheduler component 512A and scheduler component 512B. Profile 510B may be created in a manner that does not include project component 514A, project component 514B, or some other project component. Profile 510B may be used to create a job based on scheduler component 512A, scheduler component 512B, or some other scheduler component. In one example, the job may be performed using a default project component and/or default project information when a project component is not identified by profile 510B. In another example, the job may be performed using project information that is provided and/or identified by means that are not associated with profile 510B, such as when user device 110 sends project information to the distributed computing environment and/or identifies a storage location from which the project information can be obtained. Profile 510B may be portable, such that profile 510B (e.g., including scheduler component 512A, scheduler component 512B, or some other scheduler component) can be imported and/or exported in a manner to be described in greater detail below with respect to FIGS. 6, 7, 11A and 11B.

Hierarchy 500 may include a third hierarchy 575 that includes profile 510C, scheduler component 512C, and project component 514A or project component 514B. Hierarchy 575 may represent a profile that has been created based on one scheduler component and one project component, and where the profile can be modified by replacing the project component with another project component. For example, profile 510C may be created based on scheduler component 512C and either project component 514A or project component 514B. Profile 510C may be created in a manner that does not include both project component 514A and project component 514B. Profile 510C may be used to create a job in a manner similar to that described above with respect to first hierarchy 525. Profile 510C may be portable, such that profile 510C (e.g., including scheduler component 512C and either project component 514A or project component 514B) can be imported and/or exported in a manner which is to be described in greater detail below with respect to FIGS. 6, 7, 11A and 11B.

Example Process for Creating a Scheduler Component

Figure 6:
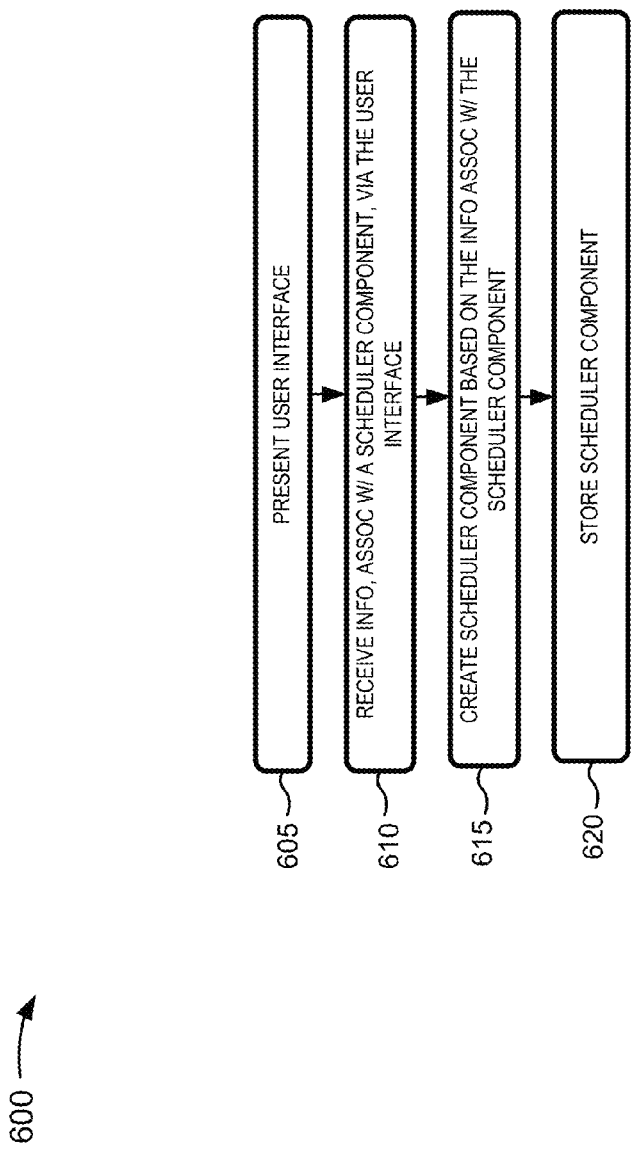
FIG. 6 is a flow chart of an example process for creating a scheduler component, according to an implementation described herein.
Figure 7:
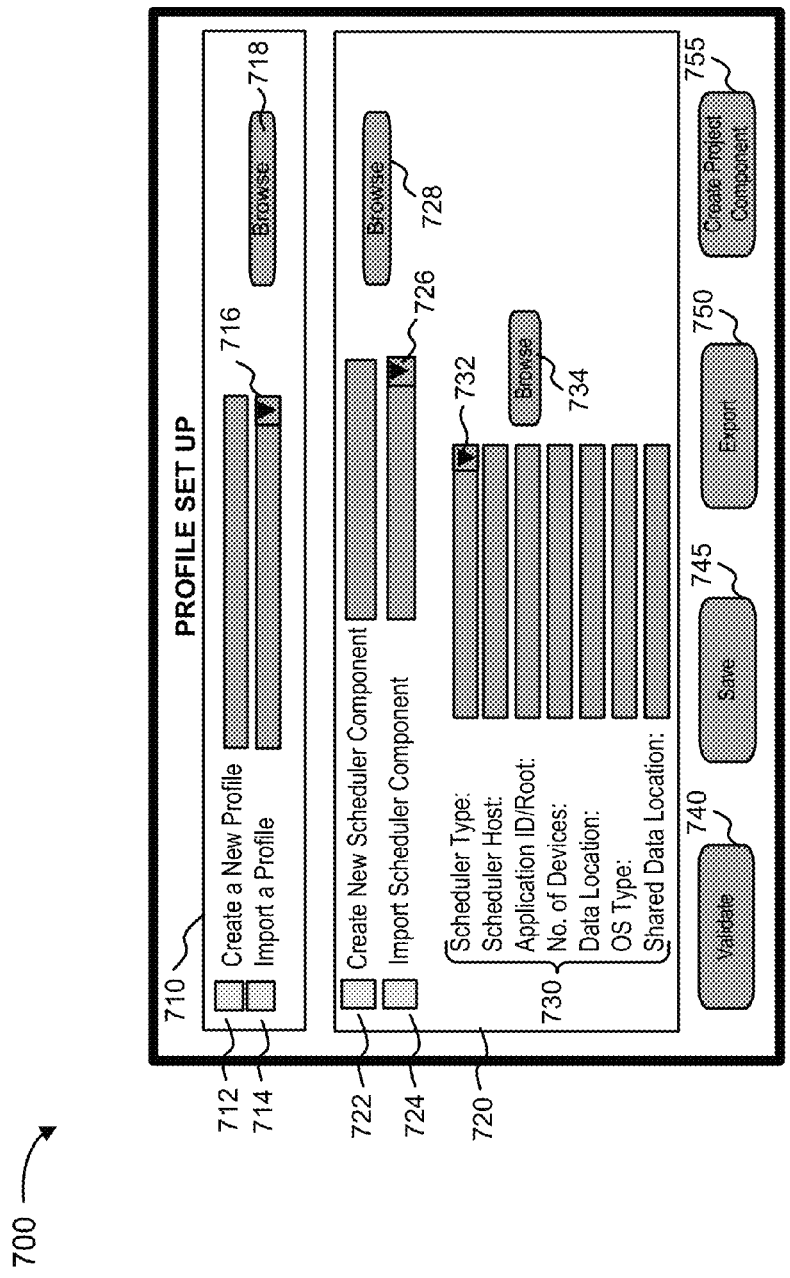
FIG. 7 is a diagram of an example user interface for setting up a profile and/or scheduler component, according to an implementation described herein.

FIG. 6 is a flow chart of an example process 600 for creating a scheduler component, according to an implementation described herein. In one implementation, process 600 may be performed by user device 110. In another implementation, process 600 may be performed by a device, or group of devices, separate from, or in combination with user device 110. Process 600 may correspond to or be part of block 415 of FIG. 4. FIG. 7 is a diagram of an example user interface 700 for setting up a profile and/or scheduler component, according to an implementation described herein. In the discussion below, a portion of process 600, of FIG. 6, will be described with references to user interface 700 of FIG. 7.

As shown if FIG. 6, process 600 may include presenting a user interface (block 605) and receiving information, associated with a scheduler component, via the user interface (block 610). For example, user device 110 may receive, from a user of user device 110, a request to create a scheduler component and/or a profile. User device 110 may, in response to the request, present a user interface (e.g., user interface 700 of FIG. 7) for display on user device 110.

As illustrated in FIG. 7, user interface 700 may include a collection of fields and/or buttons, such as a profile field 710, a scheduler component field 720, a validate button 740, a save button 745, an export button 750, and a create project component button 755. Profile field 710 may allow a user, of user device 110, to create or import a profile. The discussion below describes the profile and/or scheduler component being imported, created, modified, exported, etc. by the user of user device 110 for simplicity. In another example, an operator (e.g., acting as a network administrator), of management device 125, may import, create, modify, and/or export the profile and/or scheduler component.

Profile field 710 may include a collection of fields and/or buttons such as a create new profile field 712, an import profile field 714, and a browse button 718. Create new profile field 712 may allow the user to create a new profile when the user selects a box associated with create new profile field 712. The user may enter information that uniquely identifies the new profile (e.g., a unique profile name, identifier, etc.). Import profile field 714 may, when selected by the user, allow the user to import an existing profile. The user may select pull-down button 716 to cause a pull-down menu to be display that includes a list of existing profiles (e.g., stored in database 130 and/or some other location) from which to select. The user may select one of the existing profiles, which may cause user device 110 to retrieve, from database 130 and/or another location, information associated with the selected profile. In another example, the user may select a default profile which may cause user device 110 to retrieve, from database 130 and/or another location, information associated with the default profile. Browse button 718 may, when selected by the user, allow the user to browse a memory associated with user device 110, database 130 and/or some other memory for a profile to import.

Scheduler component field 720 may include a collection of fields and/or buttons such as a create new scheduler component field 722, an import scheduler component field 724, a browse button 728, a settings field 730, and/or a browse button 734. In one example, the user may use scheduler component field 720 to create, import, and/or modify a scheduler component. In another example, scheduler component field 720 may allow a scheduler component to be associated with a profile and/or to replace an existing scheduler component associated with a profile identified in profile field 710. In yet another example, the user may modify settings, associated with a scheduler component, that have been pre-populated into settings field 730 as a result of the user creating a profile, and/or importing a scheduler component and/or profile.

Create new scheduler component field 722 may allow the user to create a new scheduler component when the user selects a box associated with create new scheduler component field 722. The user may enter information that uniquely identifies the new scheduler component (e.g., a unique scheduler component name, identifier, etc.). Import scheduler component field 724 may, when selected by the user, allow user device 110 to import an existing scheduler component. The user may select pull down button 726 to cause a pull down menu to be display that includes a list of existing scheduler components (e.g., stored in database 130 and/or some other location) from which to select. The user may select one of the existing scheduler components, which may cause user device 110 to retrieve, from database 130 or another location, information associated with the selected scheduler component.

In one example, user device 110 may populate settings field 730 with information associated with the selected scheduler component. In another example, the user may select a default scheduler component which may cause user device 110 to retrieve, from database 130 and/or some other location, information associated with the default scheduler component. User device 110 may populate settings field 730 with information associated with the default scheduler component. Browse button 728 may, when selected by the user, allow the user to browse a memory associated with user device 110, database 130, and/or some other location for a scheduler component to import.

In another example, user device 110 may subscribe to a messaging service (e.g., a feed), from a web server (e.g., via the Internet or some other network) from which information associated with profiles and/or scheduler components can be received, imported, and/or used to create a profile and/or scheduler component. In this example, user device 110 may receive the information associated with a profile and/or scheduler component, via management device 125, when management device 125 pushes the information associated with the profile and/or scheduler component to user device 110. User device 110 may pre-populate fields associated with user interface 900 using the information associated with the profile and/or scheduler component.

Settings field 730 may be pre-populated with settings associated with a scheduler component that was imported by user device 110 and/or associated with an imported profile. The user may choose to keep the pre-populated settings or to modify the settings to create a new and/or modified scheduler component and/or profile. In another example, settings field 730 may not be pre-populated with settings associated with a scheduler component (e.g., when the user creates a new profile or a new scheduler component).

A first settings field 730 may allow the user to specify a type of scheduler to be associated with the scheduler component. In one example, the user may select pull-down button 732 to cause a list of schedulers to be displayed from which the user may select a scheduler to be associated with the scheduler component. A second settings field 730 may allow the user to enter a device on which a scheduler is hosted and/or from which the scheduler can be retrieved (e.g., user device 110, network management device, etc.). A third settings field 730 may allow the user to specify an application to be executed by one or more computing devices 120 associated with a distributed computing environment. Additionally, or alternatively, the third settings field 730 may allow the user to identify a path and/or location from which the identified application can be accessed and/or obtained. In an example implementation, the application may correspond to TCE 115.

A fourth settings field 730 may allow the user to identify a quantity of computing devices 120 to be included in the distributed computing environment. A fifth settings field 730 may allow the user to specify a storage location from which application information (e.g., that identifies an application, TCE 115, etc.) to be used perform a job, validate a profile and/or scheduler, and/or to access the application is to be retrieved. A sixth settings field 730 may allow the user to specify a type of operating system on which one or more computing devices 120, associated with a distributed computing environment, are to be based. A seventh settings field 730 may allow the user to enter a shared data location to which a job result is to be stored. Browse button 734 may, when selected by the user, allow the user to browse a memory associated with user device 110, database 130, and/or some other memory to identify a device on which the scheduler is hosted, the data location, and/or the shared data location.

The type of scheduler identified in the first settings field 730 may cause one or more of the other settings fields 730 to be disabled in a manner that prevents the user from entering information. For example, a first scheduler type may automatically identify a scheduler host, a quantity of computing devices and/or the operating system type, which may cause user device 110 to disable (e.g., hide, change appearance, etc.) the second settings field 730 associated with the scheduler host, the fourth settings field 730 associated with the quantity of computing devices 120, and/or the sixth settings field 730 associated with the type of operating system. In another example, a second scheduler type may automatically identify the quantity of computing devices, which may cause user device 110 to disable the fourth settings field 730 associated with the quantity of computing devices 120.

Validate button 740 may, when selected by the user, allow the profile and/or scheduler component to be validated in a manner similar to that described above with respect to block 420 and/or 440 of FIG. 4. Save button 745 may, when selected by the user, cause user device 110 to save the profile and/or scheduler component to a memory associated with user device 110. Export button 750 may, when selected by the user, cause user device 110 to export the profile and/or scheduler component to another user device 110, management device 125, and/or database 130 in a manner to be described below with respect to FIGS. 11A and 11B. Create project component button 755 may, when selected by the user, cause user device 110 to present another user interface that allows the user to import or create a project component in a manner to be described in greater detail in FIGS. 8 and 9.

The fields and/or buttons included within user interface 700 are included for explanatory purposes only. In another implementation, user interface 700 may include additional fields and/or buttons, fewer fields and/or buttons, different fields and/or buttons, or differently arranged fields and/or buttons than are described with respect to user interface 700.

Returning to FIG. 6, user device 110 may receive, via user interface 700 of FIG. 7, information associated with the scheduler component when the user selects a particular button (e.g., save button 745 or some other button) associated with user interface 700.

As also shown in FIG. 6, process 600 may include creating the scheduler component based on the information associated with the scheduler component (block 615) and storing the scheduler component (block 620). For example, user device 110 may create the scheduler component based on the information associated with the scheduler component that was received via user interface 700 of FIG. 7. User device 110 may also, or alternatively, store the scheduler component in a memory associated with the user device 110 and/or database 130.

Example Process for Creating a Project Component

Figure 8:
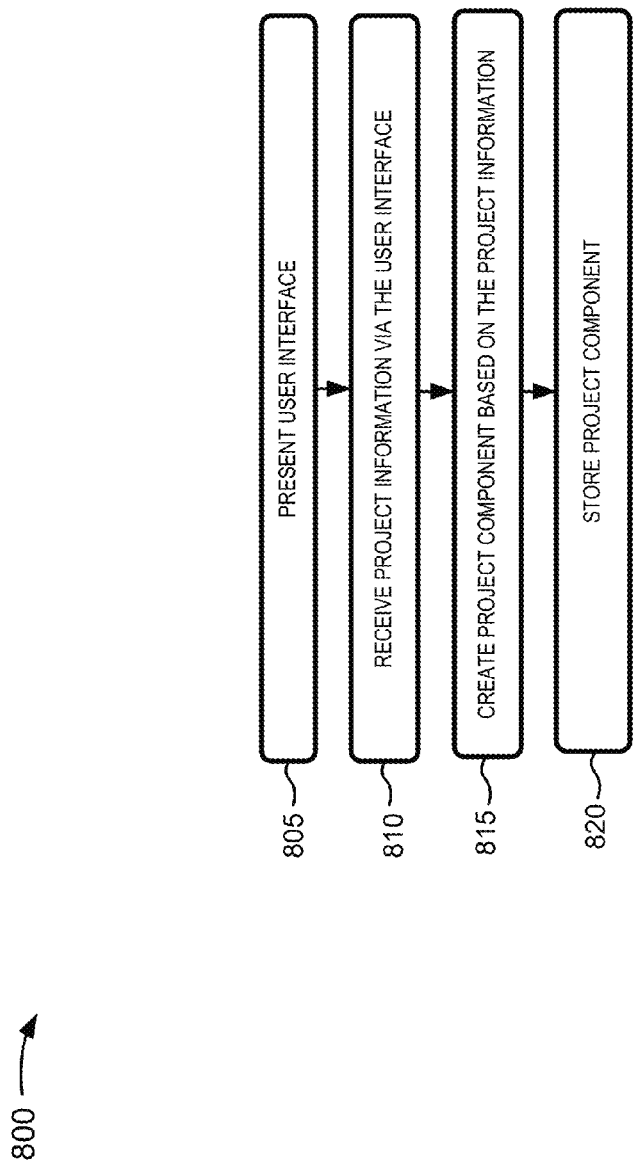
FIG. 8 is a flow chart of an example process for creating a project component, according to an implementation described herein.
Figure 9:
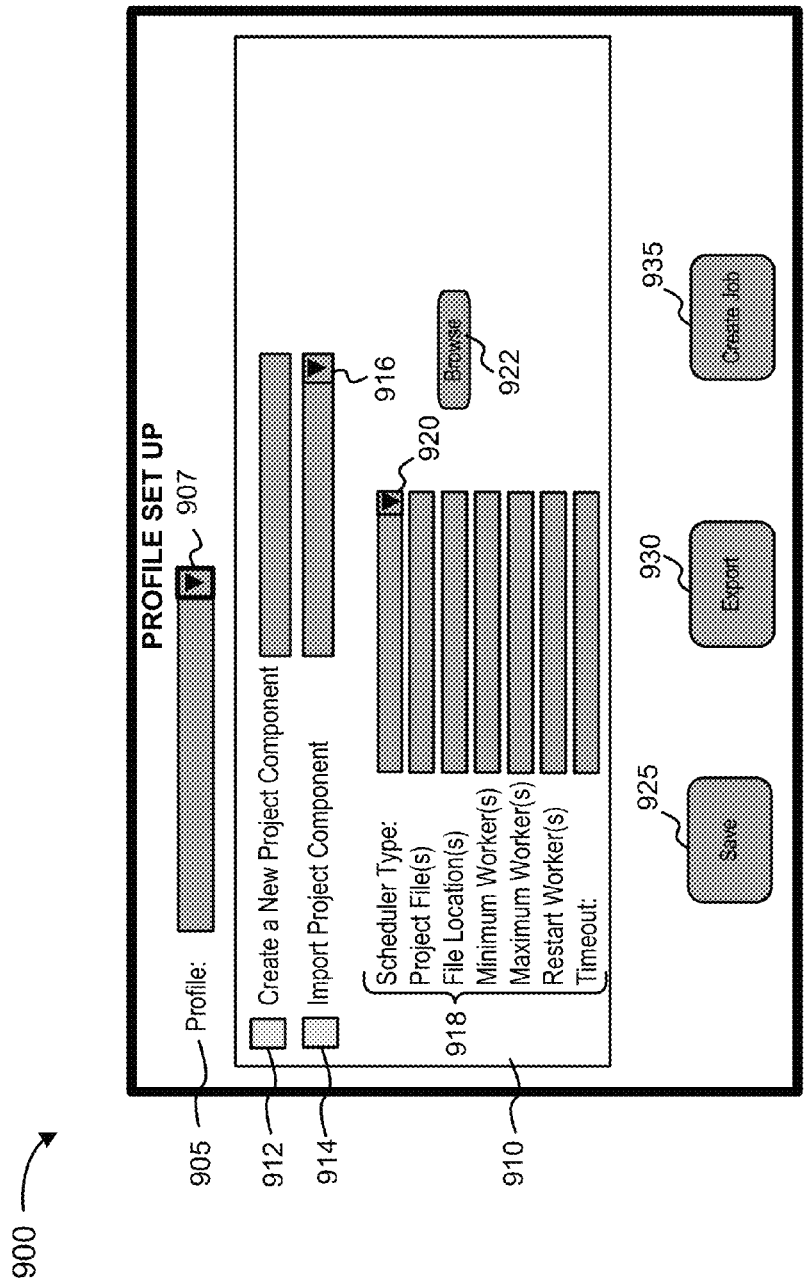
FIG. 9 is a diagram of an example user interface for setting up a project component, according to an implementation described herein.

FIG. 8 is a flow chart of an example process 800 for creating a project component according to an implementation described herein. In one implementation, process 800 may be performed by user device 110. In another implementation, process 800 may be performed by a device, or group of devices, separate from, or in combination with user device 110. Process 800 may correspond to or be part of block 425 and/or block 430 of FIG. 4. FIG. 9 is a diagram of an example user interface 900 for setting up a project component, according to an implementation described herein. In the discussion below, a portion of process 800, of FIG. 8, will be described with references to user interface 900 of FIG. 9.

As shown in FIG. 8, process 800 may include presenting a user interface (block 805) and receiving information associated with a project component via the user interface (block 810). For example, user device 110 may receive, from a user of user device 110, a request to create a project component. In one example, user device 110 may receive the request when the user, of user device 110, selects a particular button (e.g., create project component 755) associated with user interface 700 (FIG. 7). User device 110 may, in response to the request, present a user interface (e.g., user interface 900 of FIG. 9) for display on user device 110.

As illustrated in FIG. 9, user interface 900 may include a collection of fields and/or buttons, such as a profile field 905, a project component field 910, a save button 925, an export button 930, and a create job button 935. The discussion below describes the project component being created, imported, modified and/or exported by the user of user device 110 for simplicity. In another example implementation, an operator, of management device 125, may create, import, modify, and/or or export the project component.

Profile field 905 may identify a profile with which a project component is to be associated. In one example, user device 110 may pre-populate profile field 905 with information that identifies a profile that has been created by the user in a manner similar to that described above with respect to FIGS. 6 and 7. Additionally, or alternatively, profile field 905 may allow the user to select a profile, with which to associate a project component, from a list of existing profiles displayed via a pull-down menu when the user selects pull-down button 907.

Project component field 910 may include a collection of fields and/or buttons, such as a create new project component field 912, an import project component field 914, a settings field 918, and/or a browse button 922. The user may use project component field 910 to create, import, and/or associate a project component with a profile. In another example, the user may use project component field 910 to modify settings, associated with a project component, that have been pre-populated into project component field 910 as a result of the user using an existing profile and/or importing a project component.

Create new project component field 912 may allow the user to create a new project component when the user selects a box associated with create new project component field 912. The user may enter information that uniquely identifies the new project component (e.g., a unique project component name, identifier, etc.). Import project component field 914 may, when selected by the user, allow user device 110 to import an existing project component. The user may select pull-down button 916 to cause a pull-down menu to be display that includes a list of existing project components from which to select. The user may select one of the existing project components, which may cause user device 110 to retrieve, from database 130 or some other location, information associated with the selected project component.

In another example, user device 110 may subscribe to a messaging service (e.g., a feed), from a web server (e.g., via the Internet or some other network) from which project component descriptions and/or information can be received, imported, and/or used to create a project component. In this example, user device 110 may receive the project component descriptions and/or information, via management device 125, when management device 125 pushes the project component descriptions and/or information to user device 110. User device 110 may pre-populate fields associated with user interface 900.

User device 110 may populate settings field 918 with information associated with the selected project component. The user may choose to keep the pre-populated settings or to modify the settings to create a new or modified project component. In another example, settings field 918 may not be pre-populated with information, associated with a project component, when the user creates a new profile or a new project component.

A first settings field 918 may allow the user to specify a type of scheduler to be associated with the project component. The first settings field 918, may be disabled if the project component is to be associated with a profile with which a scheduler component, that has identified a scheduler type, is associated. The user may select pull-down button 920 that allows the user to select the type of scheduler from a list of scheduler types displayed in a pull-down menu. A second settings field 918 may allow one or more files to be identified from which project information (e.g., programming code, a script, input variables, etc.) can be obtained. A third settings field 918 may allow the user to identify a storage location from which the files can be obtained. The user may, by selecting browse button 922, browse a memory associated with user device 110, database 130, and/or some other device to identify the storage location.

A fourth settings field 918 may allow the user to identify a minimum quantity of workers to be used when perform a job based on a profile with which the project component is associated. A fifth settings field 918 may allow the user to identify a maximum quantity of workers to be used when performing the job. The quantity of workers may correspond to a quantity of instantiations of an application that is to be executed, by the distributed computing environment identified by the profile, to perform the job. In an example implementation, the application may correspond to TCE 115. A sixth settings field 918 may allow the user to identify conditions under which a worker is to be restarted in the event that the worker crashes or does not execute properly. A seventh settings field 918 may allow the user to specify a period of time during which the workers are permitted to execute to generate a job result before timing out (e.g., when execution is terminated).

In a manner similar to that described above with respect to FIGS. 6 and 7, the type of scheduler identified in the first settings field 918 may cause one or more of the other settings fields 918 to be disabled in a manner that prevents the user form entering information. For example, a first scheduler type may automatically identify a minimum and/or maximum quantity of workers to be used to perform the job, which may cause user device 110 to disable (e.g., hide, change appearance, etc.) the fourth and/or fifth settings fields 918, respectively. In another example, a second scheduler type may automatically identify conditions under which a worker can be restarted and/or period of time during which the job is to be performed, which may cause user device 110 to disable the sixth and/or seventh settings fields 918, respectively.

Save button 925 may, when selected by the user, cause user device 110 to save the profile and/or project component to a memory associated with user device 110. Export button 930 may, when selected by the user, cause user device 110 to export the profile and/or project component to another user device 110, management device 125, and/or database 130 in a manner to be described in greater detail below with respect to FIGS. 11A and 11B. Create job button 935 may, when selected by the user, cause user device 110 to create a job based on the profile, with which the project component is associated, in a manner to be described in greater detail below with respect to FIG. 10.

The fields and/or buttons included within user interface 900 are included for explanatory purposes only. In another implementation, user interface 900 may include additional fields and/or buttons, fewer fields and/or buttons, different fields and/or buttons, or differently arranged fields and/or buttons than are described with respect to user interface 900.

Returning to FIG. 8, user device 110 may receive, via user interface 900 of FIG. 9, information associated with the project component when the user selects a particular button (e.g., save button 925 or some other button) associated with user interface 900.

As also shown in FIG. 8, process 800 may include creating the project component based on the information associated with the project component (block 815) and storing the project component (block 820). For example, user device 110 may create the project component based on the information associated with the project component that was received via user interface 900 of FIG. 9. User device 110 may also, or alternatively, store the project component in a memory associated with the user device 110 and/or database 130.

Example Process for Creating a Job Based on a Profile

Figure 10:
FIG. 10 is a flow chart of an example process for creating and/or performing a job based on a profile, according to an implementation described herein.

FIG. 10 is a flow chart of an example process 1000 for creating a job, based on a profile, according to an implementation described herein. In one implementation, process 1000 may be performed by user device 110. In another implementation, process 1000 may be performed by a device, or group of devices, separate from, or in combination with user device 110.

As shown in FIG. 10, process 1000 may include receiving a request to perform a job based on a profile (block 1005) and obtaining a profile in response to the request (block 1010). For example, a user, of user device 110 may instruct user device 110 to create a job based on a profile. In one example, user device 110 may receive the request when the user selects a particular button (e.g., create job button 935) associated with a user interface (e.g., user interface 900 of FIG. 9). User device 110 may, in response to the request, obtain information, associated with a profile, that was identified by the request. For example, user device 110 may retrieve the profile from a memory associated with user device 110, from database 130, from a web server (e.g., by downloading the profile from a web site), and/or from some other device. In another example, user device 110 may import the profile from a message (e.g., as an attachment to an email, embedded in an instant message, etc.) that was received from another user device 110 and/or management device 125. The information, associated with the profile, may include information associated with a scheduler component and information associated with a project component.

As also shown in FIG. 10, process 1000 may include creating the job based on the profile (block 1015) and transmitting an instruction to perform the job based on the profile (block 1020). User device 110 may create a job, based on the profile, by generating an instruction that includes information associated with the profile. User device 110 may identify a scheduler based on the information associated with the scheduler component. User device 110 may instruct the identified scheduler to communicate with management device 125 to establish the distributed computing environment based on one or more computing devices 120. The scheduler may cause user device 110 to transmit the instruction, to management device 125, based on an indication, received from management device 125, that the distributed computing environment has been established in a manner identified by the scheduler.

As further shown in FIG. 10, process 1000 may include receiving a request for project information identified in the instruction (block 1025) and transmitting the project information in response to the request for the project information (block 1030). Management device 125 may receive the instruction and may cause one or more instantiations of an application, identified by the scheduler component, to be established on one or more of computing devices 120. The quantity of instantiations of the application may be identified based on the project component obtained from the instruction. In an example implementation, the application may correspond to TCE 115.

Additionally, or alternatively, management device 125 may transmit, to user device 110, a request for project information, identified by the project component, with which to perform the job. User device 110 may receive the request for the project information and may retrieve the project information from a storage location identified by the project component. User device 110 may transmit the project information to management device 125 and management device 125 may receive the project information. In another example, management device 125 may obtain the project information directly from the location identified by the project component.

The project information may include programming code and/or a script, that when executed by the application and/or TCE 115, generates input data that the application and/or TCE 115 are to use to execute and/or return a job result. Additionally, or alternatively, the project information may include input data that the application and/or TCE 115 are to use to execute and/or return a job result. Additionally, or alternatively, the project information may include programming code and/or a script that is to be executed by the one or more computing devices 120 instead of, or in addition to, executing the application and/or TCE 115.

As still further shown in FIG. 10, process 1000 may include receiving a result associated with the job (block 1035). Management device 125 may distribute the project information to the one or more computing devices 120. Computing devices 120 may receive the project information and may use the project information when executing the application and/or TCE 115. Additionally, or alternatively, computing devices 120 may execute programming code and/or a script, obtained from the project information. Computing devices 120 may return a job result based on executing the application, TCE 115, and/or the programming code and/or the script. The job result may be transmitted to management device 125 for forwarding to user device 110. User device 110 may receive the job result from management device 125 and/or computing devices 120. Additionally, or alternatively, computing devices 120 and/or management device 125 may forward the job result to a shared memory location (e.g., associated with database 130 or some other device) that can be accessed by user device 110 to retrieve the job result.

Figure 11B:
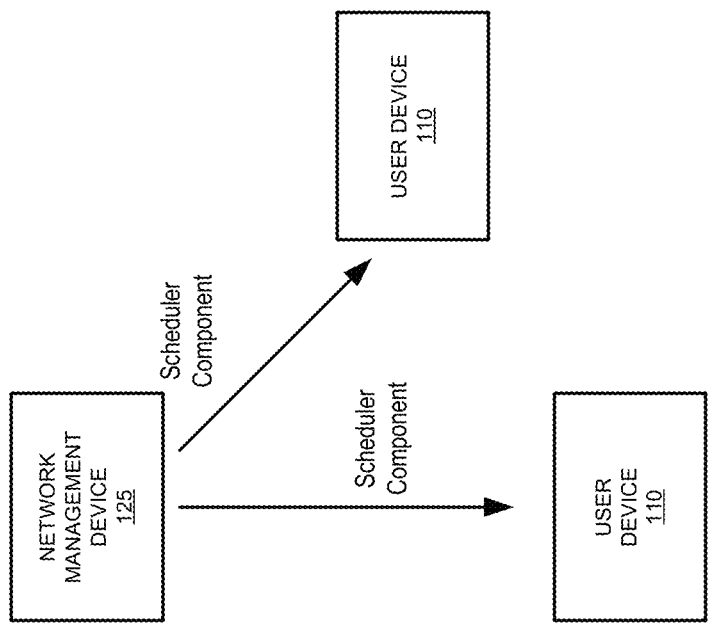
FIGS. 11A and 11B are diagrams that illustrate portability of a scheduler component between devices identified in FIG. 1.
Figure 11A:
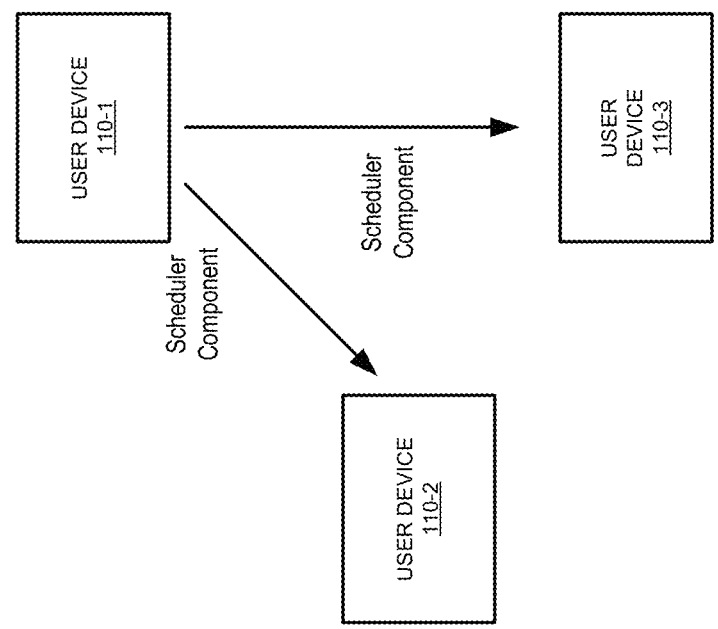

FIGS. 11A and 11B are diagrams that illustrate portability of a scheduler component between devices of environment 100. As shown in FIG. 11A, user device 110 may export a scheduler component by pushing the scheduler component to other user devices 110 (e.g., as shown by the arrows pointing from user device 110-1 to other user devices 110-2 and 110-3). User device 110 may, for example, push a scheduler component by emailing the scheduler component (e.g., as an attachment to the email) to the other user devices 110. In another example, user device 110 may push the scheduler component, as part of an instant message, to the other user devices 110. In yet another example, user device 110 may push the scheduler component by uploading the scheduler component to a web site that allows the other user devices 110 to download the scheduler component from the web site. In still another example, user device 110 may push the scheduler component by storing the scheduler component to a storage device (e.g., database 130) that can be accessed by the other user devices 110 to retrieve the scheduler component. Additionally, or alternatively, user device 110 may, in a manner similar to that described above with respect to the scheduler component, push a project component and/or a profile to the other user devices 110. Pushing the project component, the scheduler component, and/or the profile allows project component, the scheduler component, and/or the profile to be shared by other users, thereby saving users from having to recreate the project component and/or profile themselves.

As shown in FIG. 11B, management device 125 may, in a manner similar to that described above with respect to FIG. 11A, export a scheduler component to one or more user devices 110. For example, management device 125 may push the scheduler component to one or more user devices 110 (e.g., as shown by the arrows, labeled as "scheduler component," pointing from management device 125 to user devices 110-1 and 110-2). Management device 125 may push the scheduler component using via an email message, via an instant message, by causing user devices 110 to store the scheduler component, by uploading the scheduler component to a web site, and/or by storing the scheduler component in a shared memory.

Additionally, or alternatively, management device 125 may push a profile, a scheduler component, and/or a project component to one or more workers (e.g., instantiations of TCE 115 and/or some other application) hosted by one or more computing devices 120. For example, a first worker, hosted by computing device 120, may receive a profile, scheduler component, and/or project component and may push one or more copies of the profile, scheduler component, and/or project component to one or more second workers hosted by computing device 120 and/or one or more third workers hosted by another computing device 120.

CONCLUSION

A system and/or method, described herein, may allow a user device to use a profile to perform a job within a distributed computing environment. The profile may permit programming code, generated using the user device, to be executed by the distributed computing environment without causing the programming code to be modified. The system and/or method may allow the user device to create the profile based on a scheduler component and a project component. The system and/or method may allow the profile, the scheduler component, or the project component to be pushed between user devices to allow the user devices to perform jobs using the distributed computing environment.

The foregoing description provides illustration and description, but is not intended to be exhaustive or to limit the description to the precise form disclosed. Modifications and variations are possible in light of the above teachings or may be acquired from practice of the implementations.

While series of blocks have been described with regard to FIGS. 4, 6, 8, and 10, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the embodiments. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
   one or more instructions, which when executed by at least one processor, cause the at least one processor to receive a request to create a profile that allows a job to be performed within a distributed computing environment comprising one or more computing devices;

one or more instructions, which when executed by the at least one processor, cause the at least one processor to provide an interface that allows the profile to be specified, the interface including an option to create a scheduler component and an option to retrieve the scheduler component;

one or more instructions, which when executed by the at least one processor, cause the at least one processor to obtain the scheduler component via the interface based on receiving the option to create the scheduler component or receiving the option to retrieve the scheduler component, the scheduler component identifying:
a scheduler to be used to schedule the job, and
an application that at least one of the one or more computing devices, that is specified by the scheduler, is to use when performing the job;

one or more instructions, which when executed by the at least one processor, cause the at least one processor to obtain, via the interface, a project component that identifies data on which the job is to be based; and one or more instructions, which when executed by the at least one processor, cause the at least one processor to create the profile based on the scheduler component and the project component.

2. The non-transitory computer-readable medium of claim 1, further comprising:
one or more instructions, which when executed by the at least one processor, cause the at least one processor to create the job, based on the profile, that allows the scheduler to cause the one or more computing devices to:
execute the application using project information, and
return a job result as a result of executing the application on the data.

3. The non-transitory computer-readable medium of claim 1, where the one or more instructions to obtain the scheduler component further include:
one or more instructions to at least one of:
retrieve the scheduler component from a memory,
create the scheduler component based on information received from a user, or
import the scheduler component from another device or a network management device.

4. The non-transitory computer-readable medium of claim 1, where the scheduler component further identifies at least one of:
a type of scheduler to be used to for the job,
a device on which the scheduler is hosted,
a communication protocol to be used to communicate with the one or more computing devices,
one or more instructions, to be communicated with the at least one of the one or more computing devices, to perform a function,
a first storage location from which the application is to be retrieved,
a second storage location where a job result is to be stored, or
a type of operating system used by the one or more computing devices.

5. The non-transitory computer-readable medium of claim 4, where the instructions further comprise:
one or more instructions to modify the scheduler component, where modifying the scheduler component identifies at least one of:
another scheduler to be used for another job,
another device on which the other scheduler is hosted,
another application to be used to perform the other job,
another communication protocol to be used to communicate with the one or more computing devices,
one or more other instructions, to be communicated with the at least one of the one or more computing devices, to perform another function,
a third storage location where the other application is to be retrieved,
a fourth storage location to be identified where results, obtained from the other job, are to be stored, or
another type of operating system to be used by the one or more computing devices or the other device; and
one or more instructions to create another profile, for the other job, based on the modified scheduler component.

6. The non-transitory computer-readable medium of claim 1, where the instructions further comprise:
one or more instructions to export the scheduler component, where exporting the scheduler component allows the scheduler component to be at least one of:
transmitted to another device;
saved to a shared memory from which the other device can retrieve the scheduler component; or
uploaded to a website that can be accessed by the other device to obtain the scheduler component.

7. The non-transitory computer-readable medium of claim 1, where the data includes at least one of:
one or more input values to be used, by the application, to generate a job result,
a program or script that, when executed, generates the one or more input values,
one or more files to be read, by the application, that allows the application to execute or generate the job result,
a time period during which the application is permitted to execute, or
a storage location from which the input values, the program or script, or the one or more files are to be obtained.

8. The non-transitory computer-readable medium of claim 1, where the instructions further comprise:
one or more instructions to modify the profile by replacing the project component with another project component, where the other project component identifies other project information; and
one or more instructions to create another profile based on the scheduler component and the other project component.

9. The non-transitory computer-readable medium of claim 8, where the instructions further comprise:
one or more instructions to create another job, based on the other profile, that allows the scheduler to instruct the one or more computing devices to perform the other job using the other project information.

10. The non-transitory computer-readable medium of claim 1, where the instructions further comprise:
one or more instructions to test the profile, using a test module, that allows the scheduler to cause the at least one, of the one or more computing devices, to:
execute the application using test data obtained from the test module; and
return a test result as a result of executing the application on the test data.

11. The non-transitory computer-readable medium of claim 10, where the instructions further comprise:

one or more instructions to validate the profile when the test results match known test results identified by the profile; and one or more instructions to store the profile based on the validation of the profile.

12. The non-transitory computer-readable medium of claim 1, where the one or more instructions to obtain the scheduler component include:

one or more instructions to receive a pushed scheduler component from a management device when the scheduler component is pushed from the management device.

13. The non-transitory computer-readable medium of claim 1, where the interface corresponds to at least one of:

a user interface that allows the user to enter profile information associated with the scheduler component or the project component, a graphical user interface that allows the user to enter the profile information, a web service interface that allows the user to enter the profile information, or an electronic interface via which the profile information can be received.

14. A method comprising:

receiving a request to create a profile that includes a scheduler component that allows one or more jobs to be performed within a distributed computing environment, the receiving being performed by a computing device;

providing, for presentation, on a display associated with the computing device and based on the request, a user interface that includes:

an option to import the scheduler component,
an option to create the scheduler component, and
an option that allows information associated with the scheduler component to be entered,
the information associated with the scheduler component identifying:
a scheduler for requesting one or more computing devices associated with the distributed computing environment to perform the one or more jobs,
the providing for presentation being performed by the computing device;

receiving, via the user interface, the information associated with the scheduler component,
the receiving the information associated with the scheduler component being performed by the computing device; and exporting, to one or more user devices, the scheduler component,
the scheduler component allowing the one or more user devices to use the distributed computing environment to perform the one or more jobs, and
the exporting being performed by the computing device.

15. The method of claim 14, where the scheduler component identifies an application, to be executed by the one or more computing devices, for performing the one or more jobs.

16. The method of claim 15, where the scheduler component allows the one or more user devices to cause the one or more computing devices to execute the application using project information provided by the one or more user devices, and
where the project information controls how the application is executed.

17. The method of claim 14, where the scheduler component allows programming code, generated by a user device of the one or more user devices, to be executed, by the one or more computing devices, without causing the user device to modify the programming code.

18. The method of claim 14, where exporting the scheduler component further includes:

storing the scheduler component in a shared memory that is accessible by the one or more user devices.

19. The method of claim 14, where exporting the scheduler component further includes:

transmitting the scheduler component to the one or more user devices using a messaging protocol.

20. The method of claim 14, where exporting the scheduler component further includes:

pushing the scheduler component to the one or more user devices.

21. The method of claim 14, further comprising:

receiving, via the user interface, project information that is to be used, by an application specified by the scheduler component, when the one or more computing devices execute the application;

generating a project component based on the project information; and exporting the project component to at least one of the one or more user devices.

22. The method of claim 21, further comprising:

generating the profile, associated with the distributed computing environment, based on the scheduler component and the project component; and exporting the profile to at least one of the one or more user devices.

23. The method of claim 22, further comprising:

creating a job based on the profile, where creating the job:
causes the scheduler component and the project component to be transmitted to at least one of the one or more computing devices, and
causes at least one of the one or more computing devices to execute the application using the project information to generate a result.

24. A device comprising:

a memory to store instructions; and
a processor to execute the instructions to:
receive a request to create a profile that allows a job to be performed within a distributed computing environment comprising one or more computing devices;
provide an interface that allows the profile to be specified,
the interface including an option to create a scheduler component and an option to retrieve the scheduler component;
obtain the scheduler component via the interface based on receiving the option to create the scheduler component or receiving the option to retrieve the scheduler component,
the scheduler component identifying:
a scheduler to be used to schedule the job, and
an application that at least one of the one or more computing devices, that is specified by the scheduler, is to use when performing the job;
obtain, via the interface, a project component that identifies data on which the job is to be based; and
create the profile based on the scheduler component and the project component.

25. The device of claim 24, where the processor is further to:

create the job, based on the profile, that allows the scheduler to cause the one or more computing devices to:
execute the application using project information, and return a job result as a result of executing the application on the data.

26. The device of claim 24, where the processor, when obtaining the scheduler component, is further to at least one of:
retrieve the scheduler component from a memory;
create the scheduler component based on information received from a user; or
import the scheduler component from another device or a network management device.

27. The device of claim 24, where the processor is further to:
modify the profile by replacing the project component with another project component, where the other project component identifies other project information; and
create another profile based on the scheduler component and the other project component.

28. The device of claim 24, where the processor is further to:
validate the profile when test results match known test results identified by the profile; and
store the profile based on the validation of the profile.

29. A device comprising:
a memory to store instructions; and
a processor to execute the instructions to:
receive a request to create a profile that includes a scheduler component that allows one or more jobs to be performed within a distributed computing environment;
provide, for presentation on a display and based on the request, a user interface that includes:
an option to import the scheduler component,
an option to create the scheduler component, and
an option that allows information associated with the scheduler component to be entered,
the information associated with the scheduler component identifying:
a scheduler for requesting one or more computing devices associated with the distributed computing environment to perform the one or more jobs;
receive, via the user interface, the information associated with the scheduler component; and
export, to one or more user devices, the scheduler component,
the scheduler component allowing the one or more user devices to use the distributed computing environment to perform the one or more jobs.

30. The device of claim 29, where the scheduler component allows the one or more user devices to cause the one or more computing devices to execute an application, for performing the one or more jobs, using project information provided by the one or more user devices, and
where the project information controls how the application is executed.

31. The device of claim 29, where the processor is further to:
receive, via the user interface, project information that is to be used, by an application specified by the scheduler component, when the one or more computing devices execute the application;
generate a project component based on the project information; and
export the project component to at least one of the one or more user devices.

32. The device of claim 29, where the processor is further to:
create a job based on a profile associated with the distributed computing environment, where creating the job:
causes the scheduler component and a project component to be transmitted to at least one of the one or more computing devices, and
causes at least one of the one or more computing devices to execute an application using project information to generate a result.

\* \* \* \* \*